United States Patent
Gouzoules

(12) 
(10) Patent No.: US 6,491,731 B1
(45) Date of Patent: Dec. 10, 2002

(54) YELLOW AZO-AND AZOXYSTILBENE DYES, THEIR PREPARATION AND THE PREPARATION OF STORAGE-STABLE AQUEOUS CONCENTRATES THEREOF

(75) Inventor: Frederick Harold Gouzoules, High Point, NC (US)

(73) Assignee: Ciba Specialty Chemicals Corporation, Tarrytown, NY (US)

( * ) Notice: Subject to any disclaimer, the term of this patent is extended or adjusted under 35 U.S.C. 154(b) by 0 days.

(21) Appl. No.: 09/578,632

(22) Filed: May 25, 2000

Related U.S. Application Data

(60) Provisional application No. 60/137,089, filed on Jun. 2, 1999.

(51) Int. Cl.⁷ .......................... C09B 67/22; C09B 67/26
(52) U.S. Cl. ................. 8/641; 8/638; 8/639; 8/527; 8/919
(58) Field of Search ................. 8/641, 638, 919, 8/527

(56) References Cited

U.S. PATENT DOCUMENTS

| | | | |
|---|---|---|---|
| 3,905,949 A | 9/1975 | Perkins et al. ............ 260/143 |
| 4,310,331 A | 1/1982 | Arsac et al. ............ 8/527 |
| 4,502,864 A | * 3/1985 | Cleverdon | |
| 4,560,745 A | 12/1985 | Weberndoerfer et al. ... 534/728 |
| 4,617,381 A | 10/1986 | Hinson et al. ............ 534/576 |
| 5,041,539 A | 8/1991 | Tzikas et al. ............ 534/572 |

FOREIGN PATENT DOCUMENTS

| | | |
|---|---|---|
| EP | 0122224 | 10/1984 |
| GB | 1480712 | 7/1977 |

OTHER PUBLICATIONS

BIOS 1548, Oct. 1946 p. 169.*
Color Index, Third Edition, 1971, pp. 2008, 2011, 4365, 4366.*

* cited by examiner

*Primary Examiner*—Margaret Einsmann
(74) *Attorney, Agent, or Firm*—Kevin T. Mansfield

(57) ABSTRACT

A mixture of yellow azo- and azoxystilbene dyes having the shade of a C.I. Direct Yellow 11 dye is obtainable from the self-condensation of 4,4'-dinitro-2,2'-stilbenedisulfonic acid in the presence of an alkali metal hydroxide and an excess of formaldehyde beyond that needed for the conversion of 4,4'dinitro-2,2'-stilbenedisulfonic acid to Direct Yellow 6. Concentrated aqueous solutions of the dyes are obtainable by converting the sparingly soluble alkali metal salt of the dye into a water-soluble alkanolammonium salt by a double cation exchange via a lipophilic ammonium salt, in which process the double ion exchange is carried out in a two-phase system of methyl isobutyl ketone/water and using, for the first ion exchange a trialkylamine containing a total of 12 to 40 carbon atoms and, for the second ion exchange, a mono-, di- or trialkanolamine containing 2 to 4 carbon atoms in each alkyl moiety. The dyes are especially useful for dyeing paper.

20 Claims, No Drawings

YELLOW AZO-AND AZOXYSTILBENE DYES, THEIR PREPARATION AND THE PREPARATION OF STORAGE-STABLE AQUEOUS CONCENTRATES THEREOF

This application claims benefit of Provisional Application Serial No. 60/137,089 filed Jun. 2, 1999.

The present invention relates to a novel mixture of yellow azo- and azoxystilbene dyes, a process for the preparation of concentrated storage-stable dye solutions thereof, to the dye solutions so obtained, and to the use thereof.

The self-condensation of 4-nitrotoluene-2-sulfonic acid, which leads in a simple manner to yellow azo- and azoxystilbene dyes, has long been known. Commercial preparatory methods are described for example in BIOS Report 1548. These dyes are substantive dyes which are used in particular for dyeing paper. The most important and commercially significant of them is known as C.I. Direct Yellow 11 (abbreviated as DY 11), a reddish hue yellow direct dye.

It is known that the condensation of 4-nitrotoluene-2-sulfonic acid in the presence of sodium hydroxide solution results in the formation of insufficiently water-soluble sodium salts of the azo- and azoxystilbene dyes. It is also known that numerous azo/azoxystilbene components result from said condensation reaction, having various degrees of affinity for substrates. aqueous concentrates thereof The condensation of 4,4'-dinitro-2,2'-stilbenedisulfonic acid with caustic soda and formaldehyde, which leads in a simple manner to yellow azo- and azoxystilbene dyes, has also long been known. The dye which results, known as C.I. Direct Yellow 6 (abbreviated as DY 6), a greenish yellow dye, is also an insufficiently water-soluble sodium salt of the azo- and azoxystilbene dyes. It is known that DY 6 is composed of fewer components than DY 11. Due to the pre-formed stilbene unit, this dye has fewer structural permutations, resulting in a higher brightness and relative affinity of the dye compared to DY 11.

Concentrated aqueous solutions which are used with advantage for e.g. the dyeing of paper in the pulp cannot be prepared from these salts, as their solubility in water is only about 1 g/100 ml. There has therefore been no lack of attempts to carry out the condensation in such a manner that the dye is obtained directly in the form of a concentrated aqueous solution.

U.S. Pat. No. 3,905,949 describes a process in which a condensation is carried out using the lithium salt of 4-nitrotoluene-2-sulfonic acid as starting material in the presence of lithium hydroxide as base, affording the dye in the form of a highly concentrated and very readily water-soluble paste. The lithium salts of the azo- and azoxystilbene dyes so obtained are not only very readily water-soluble, but also have greater substantivity compared with the sodium salts. However, the lithium salts have the drawback that they do not form stable dye solutions. Instead, the concentrated solutions have a propensity during storage to gel formation, crystallization or flocculation, even in the presence of formulation auxiliaries such as urea, thus making it difficult or even impossible to use them. Furthermore, the maximum tolerance for electrolyte and non-dye solute in these formulations defines a maximum degree of optional reduction that can be tolerated, and therefore the shade of resulting dye.

The condensation of 4-nitrotoluene-2-sulfonic acid in the presence of sodium hydroxide and alkanolamines, in aqueous/alcoholic medium, is disclosed in German Offenlegungsschrift No. 31 10 261. In this process, storage-stable dye solutions are obtained due to the organic solvent. The drawback is, however, that these formulations contain a relatively high concentration of organic solvents such as glycol ethers and thus are less attractive on the basis of their VOC content.

European published patent application No. 122 224 relates to a process for the preparation of concentrated aqueous solutions of azo- and azoxystilbene dyes, which comprises carrying out the base-catalyzed condensation of 4-nitrotoluene-2-sulfonic acid in the presence of a mixture of a $C_2$–$C_4$monoalkanolamine and a di- or trialkanolamine, and removing the inorganic salts from the dye solution. Accordingly, in this process it is necessary to remove the inorganic salts by e.g. a membrane separation process.

A method of preparing dyes of low electrolyte content is disclosed in U.S. Pat. No. 4,560,745, wherein the dye is initially converted into a lipophilic amine salt in the absence of a co-solvent, in order to separate it from the salt-containing synthesis solution. The diethanolammonium salt of the dye is subsequently prepared by addition of diethanolamine and the lipophilic amine is recovered. When this process is applied to azo- and azoxystilbene dyes, it has the disadvantage that no good separation of the liquid phases is obtained with higher carbon lipophilic amines, and low carbon ($\leq C_{12}$) lipophilic amines are subject to impractical degree of loss in the aqueous waste stream along with the electrolyte. These factors contribute to less attractive economic and environmental performance than is desirable.

It is an object of the present invention to provide a process which can be easily carried out by which azo- and azoxystilbene dyes are obtained from 4,4'-dinitro-2,2'-stilbenedisulfonic acid which have the shade characteristics of C.I. Direct Yellow 11, but which perform with superior levels of cellulosic affinity, lighffastness and fastness to acid and alkali. It is a further object of the present invention to provide concentrated aqueous solutions of said dyes which are storage-stable and substantially free from organic solvents and inorganic salts and are obtainable at strengths much higher than obtainable by other DY 11 processes.

It has now been found that a mixture of yellow azo- and azoxystilbene dyes having the shade of a C.I. Direct Yellow 11 dye is obtainable by self-condensing 4,4'-dinitro-2,2'-stilbenedisulfonic acid in the presence of an alkali metal hydroxide and with an excess of formaldehyde beyond that needed for the conversion of 4,4'dinitro-2,2'-stilbenedisulfonic acid to Direct Yellow 6, to obtain a dye in the form of an alkali metal salt, preferably as the sodium salt. It has also been found that such dyes may be obtained in the form of concentrated aqueous solutions by conversion of this dye, in the form of an alkali metal salt, in a two-phase system consisting of a water-insoluble low molecular weight ketone and water, into a readily water-soluble alkanolammonium salt by double cation exchange via a lipophilic ammonium salt.

C.I. Direct Yellow 6 dye is obtained by self-condensing 4,4'-dinitro-2,2'-stilbenedisulfonic acid in the presence of an alkali metal hydroxide and with 2.0–2.5 moles of formaldehyde per mole of 4,4'-dinitro-2,2'-stilbene-disulfonic acid. It has been found that the greenish yellow hue this dye can be shifted toward the red by employing an excess of formaldehyde. Advantageously a 55–80% molar excess of formaldehyde, i.e. about 3.5–4.1 moles per mole of 4,4'-dinitro-2,2'-stilbene-disulfonic acid is employed. A 70–80% excess of formaldehyde, i.e. about 3.9–4.0 moles per mole of 4,4'-dinitro-2,2'-stilbene-disulfonic acid is preferably employed. Most preferably about a 75% molar excess of formaldehyde, i.e. 3.95 moles per mole of 4,4'-dinitro-2,2'-stilbene-disulfonic acid is employed.

Accordingly, one aspect of the invention relates to a process for the preparation of a concentrated storage-stable aqueous solution of a reddish-hued mixture of yellow azo- and azoxystilbene dyes which comprises self-condensation of 4,4'-dinitro-2,2'-stilbenedisulfonic acid in the presence of an alkali metal hydroxide and 3.5 to 4.1 moles, preferably 3.9–4.0 moles, per mole of 4,4'-dinitro-2,2'-stilbenedisulfonic acid of formaldehyde, and then converting the sparingly soluble alkali metal salt of the dye into a water-soluble alkanol-ammonium salt by a double cation exchange via a lipophilic ammonium salt, in which process the double ion exchange is carried out in a two-phase system of a water-insoluble low molecular weight ketone and water and using, for the first ion exchange a trialkylamine having a total of 12 to 40 carbon atoms and, for the second ion exchange, a mono, di- or trialkanolamine containing 2 to 4 carbon atoms in each alkyl moiety.

The process of this invention thus comprises for example treating the dye obtained by self-condensation of 4,4'-dinitro-2,2'-stilbenedisulfonic acid in the presence of an alkali metal hydroxide and excess formaldehyde, in the form of an aqueous suspension or solution, with the trialkylamine as a 10–60% solution, preferably about a 50% solution, in a water-insoluble low molecular weight ketone along with sufficient sulfuric acid to substantially generate the conjugate acid form of the lipophilic amine, separating the lighter than water organic phase that contains the amine salt of the dye from the lower aqueous phase containing undesirable electrolyte, extracting the organic phase with an alkanolamine and water, and separating the aqueous phase that contains the dye. Any residual ketone may be removed, e.g. by azeotropic distillation.

Suitable water-insoluble low molecular weight ketones include those that have a solubility in water of less than about 5 weight % at room temperature and having five to eight carbon atoms, preferably five to seven carbon atoms. Preferred aliphatic ketones include methyl isopropyl ketone, methyl n-propyl ketone, diethyl ketone, methyl n-butyl ketone, methyl isobutyl ketone and methyl n-amyl ketone, cyclohexanone, cyclopentanone, 2-methylcyclopentanone and 2-methylcyclohexanone. Methyl isobutyl ketone is the most preferred ketone, due to balance of attractive characteristics of low water solubility, ease of azeotropic distillation from the product mixture and cost factors.

By using a water-insoluble low molecular weight ketone, preferably methyl isobutyl ketone, in the organic phase, a good phase separation between the aqueous and organic phases is rapidly obtained during the formation of the lipophilic ammonium salt as well as formation of the alkanol-ammonium salt. Owing to the advantageous density differences, the dye-containing solvent phase can also be readily washed further to remove salts, with all of the phase separation and processing conveniently conducted in a single vessel owing to the specific gravity imparted by the strategic selection of the co-solvent. A virtually salt-free dye solution (low sodium ion content) affords in turn the best conditions for obtaining a highly concentrated commercial dye formulation, for example one which contains 20–50 weight % of dye solids, for even insignificant amounts of sodium ions appreciably diminish the solubility of the azo- and azoxystilbene dyes (low $K_{sp}$ for sodium salts). Methyl isobutyl ketone has been used as a solvent for commercial scale manufacture of sulfonated aromatic and particularly traditional stilbene dye liquid formulations by double cation exchange via a lipophilic ammonium salt.

The di- and trialkylamines containing 12 to 40 carbon atoms in the alkyl moieties and used for the first cation exchange reaction may be for example the following compounds: tributylamine, trihexylamine, dimethyloctadecylamine, methyldidecylamine, tridodecylamine, methyldioctylamine, tri-n-octylamine, triisooctylamine or tri-2-ethylhexylamine. Instead of the pure compounds, it is also possible to use mixtures of amines, in particular of fatty amines, e.g. coconut fatty amine and tallow fatty amine. Trialkylamines are preferred, namely those containing a total of 12 to 25 carbon atoms, in particular tributylamine and triisooctylamine.

After the first cation exchange reaction, the dye is present as a lipophilic trialkylammonium salt in the ketone phase. The salt-containing aqueous phase is separated and the dye is converted by a further cation exchange reaction into a readily water-soluble salt, namely into a mono-, di- or trialkanolammonium salt wherein each alkyl moiety contains 2 to 4 carbon atoms. Examples of suitable $C_2$–$C_4$ monoalkanolamines are ethanolamine, n-propanolamine, n-butanolamine, 2-amino-1-butanol or 2 hydroxyethoxyethylamine. Suitable dialkanolamines include diethanolamine and diisopropanolamine; and suitable $C_2$–$C_4$ trialkanolamines include triethanolamine and triisopropanolamine. Instead of the pure compounds it is also possible to use mixtures of alkanolamines.

The process of the present invention, including the preparation of the sparingly soluble alkali metal salt of the dye, may be carried out for example as follows.

Solid 4,4'-dinitro-2,2'-stilbenedisulfonic acid disodium salt is dissolved in sufficient hot water to produce a solution, preferably a nominal 8% w/w solution as the free acid, or 8.8% as 4,4'-dinitro-2,2'-stilbenedisulfonic acid disodium salt. A metal hydroxide solution, e.g. potassium hydroxide solution or preferably a sodium hydroxide solution (50% w/w) is then added. The amount of alkali metal hydroxide may vary within certain limits, but should be at least sufficient to effect oxidation of the requisite amount of formaldehyde. The 4,4'-dinitro-2,2'-stilbenedisulfonic acid salt is then subjected to a condensation reaction under alkaline conditions, e.g. in a pH range from about 11 to 13 and in the temperature range from 60 to 80° C. by the addition of formaldehyde, (3.5–4.1 moles per mole of 4,4'-dinitro-2,2'-stilbenedisulfonic acid), as paraformaldehyde or a formalin solution, preferably in the form of paraformaldehyde, over 1–5 hours. The above range of formaldehyde stoichiometry can be used to achieve any of the desired shades of yellow in current acceptance or use as Direct Yellow 11. Once the condensation is complete, the reaction mixture is then acidified to a pH range of 5–8 with a mineral acid, e.g. with sulfuric acid. The reaction mass is then transferred to an extraction vessel containing a mixture of a water-insoluble low molecular weight ketone, such as methyl isobutyl ketone and a lipophilic amine such as triisooctylamine which is preheated to 55–60° C. The neutralized dye slurry is fed concurrently with concentrated sulfuric acid (90–96% w/w) to the extraction solvents with agitation, whereby the heat generated by the reaction of the lipophilic amine with acid provides sufficient and exact thermal energy contribution to elevate the extraction mixture to 65–80° C. After about 15 minutes the agitation is stopped and the phases separate immediately. The amount of amine is so chosen that the azo- or azoxystilbene dye is converted completely into the corresponding ammonium salt. It is advantageous to use, based on the sulfo groups of the dye, more than an equimolar amount of tertiary lipophilic amine in order to minimize the color of the process effluent and to maximize yield, such as a 5 to 60% molar excess. The amount of the water-insoluble low molecular weight ketone such as methyl isobutyl ketone can vary from 40% to 90%, (w/w) based on lipophilic amine, with the highest concentration of lipophilic amine (lowest ketone content) dictating the maximum throughput from a fixed vessel size per operation cycle and therefore providing the least expensive product.

After the dye has been completely converted into the corresponding ammonium salt with a lipophilic amine, the lower aqueous phase containing inorganic salts is removed and discarded. The solvent phase is desirably washed with water alone to further remove inorganic electrolyte, or with a 5–15% (w/w) solution of water and an alkanolamine, e.g. diethanolamine, in order to selectively remove non-colored sulfonated or anionic compounds, depending on the molar excess of lipophilic amine employed and the ultimate desired solution strength of the liquid dye. Water and a $C_2$–$C_4$ alkanolamine, e.g. diethanolamine, are then added to the ketone phase that contains the dye, and the mixture is thoroughly stirred for 1 to 2 hours in the temperature range from 60 to 80° C., whereupon the hydrophilic alkanolammonium salt, e.g. diethanolmmonium salt, forms from the lipophilic ammonium salt of the dye, and the dye transfers into the aqueous phase. The alkanolamine is conveniently employed in equimolar amounts or with a slight excess (up to 10%). A good phase separation between the aqueous and organic phases is also obtained in this second cation exchange and the aqueous phase that contains the dye can be readily separated. Residual ketone can be easily removed from the aqueous dye solution by azeotropic distillation.

Finally, the dye solution can be adjusted to the desired commercial tinctorial strength by dilution. The ready for use concentrated dye solution so obtained is stable, even on prolonged storage, and has no propensity to thicken.

The recovered amine-containing ketone phase can be used directly for a new batch without any purification operations, if desired after addition of the amount of amine that has been lost in the aqueous phase. A dye formulation of uniform quality is obtained even after repeated use of the amine/ketone mixture.

The dye solutions of this invention are preferably used for dyeing sized or unsized paper in the pulp. However, they may also be used for dyeing paper by the immersion method and in the size press. Using the dye solutions of this invention for dyeing paper in the pulp, the wastewater from the paper manufacture is not colored or is significantly less colored than is the wastewater obtained by dyeing with conventional C.I. Direct Yellow 11-type dyes.

The inventive dye shows a high substantivity to the cellulose fiber. Dyeings obtained on paper have good lighffastness—the shade changes to tone-in-tone on prolonged exposure to light—and, in particular, good wetfastness properties. The dye solutions of this inventions produce paper dyeings which, relative to a typical Direct Yellow 11, have higher brightness (chroma) and resistance to shade changes upon contact with acidic and alkaline glues commonly used on converted/finished paper products.

The dye solutions of this invention display an absorption lambda max in the range 412–425 nm, as is typical of DY 11, but in contrast to the absorption lambda max observed for DY 6 of 404–410 nm.

The invention is illustrated by the following non-limiting Examples, in which parts and percentages are by weight.

EXAMPLE 1

Solid 4,4'-dinitro-2,2'-stilbenedisulfonic acid disodium salt (2550 parts) is dissolved in hot water to produce a nominal 8% w/w solution (7.8–8.2% expressed as 4,4'-dinitro-2,2'-stilbenedisulfonic acid). Then 2375 parts of 50% sodium hydroxide solution is added. The temperature of the solution is adjusted to 60–62° C. A self-condensation reaction is carried out in a pH range from about 11 to 13 and in the temperature range from 60 to 65° C. by the addition in equal increments over 2 hours of 700 parts of 93% paraformaldehyde. After the condensation is complete, the reaction mixture is then acidified with 90–96% sulfuric acid. For convenience half the reaction mass is fed to an extraction vessel containing methyl isobutyl ketone (12,850 parts) and triisooctylamine (11,600 parts) which is preheated to 55–60° C. The neutralized dye slurry is fed concurrently with concentrated sulfuric acid (1600 parts) to the extraction solvents with agitation. The vessel contents thus achieve a temperature of 65–80° C. After 15 minutes, the agitation is stopped and the phases separate immediately.

The lower aqueous phase is removed and discarded. The solvent phase is washed with 4000 parts of water or a mixture of 3600 parts of water and 400 parts diethanolamine in order to selectively remove non-colored sulfonated or anionic compounds. The lower phase, after settling, is discarded. Water (6300 parts) and diethanolamine (2350 parts), are then added to the MIBK phase that contains the dye, and this mixture is thoroughly stirred for 1 to 2 hours in the temperature range from 60 to 80° C. The agitation is stopped and the phases are allowed to settle for 0.5–3 hours, depending on the agitation used and the height:width dimensions of the phase. The lower dye-containing phase is removed and transferred to a vessel equipped for distillation. The crude dye solution is distilled at least until no more MIBK is azeotropically removed, and optionally thereafter as needed to achieve a desired product concentration.

If desired, the dye solution can be adjusted to a desired commercial tinctorial strength by dilution with water. The ready for use concentrated dye solution so obtained is perfectly stable, even on prolonged storage, and has no propensity to thicken.

EXAMPLE 2

The procedure of Example 1 is repeated, but using the equivalent amount of tri-n-octylamine instead of triisooctylamine. A concentrated, storage stable solution of the dye employed is also obtained.

EXAMPLE 3

10 g of bleached cellulose are placed into 500 ml of water having a pH of about 7 and soaked for 30 minutes. After stirring this mixture for 30 minutes, 2.5 g of the dye solution obtained in either Example 1 or 2 is added. Stirring is continued for 15 minutes to ensure uniform mixing and the liquor is diluted to 700 ml with water of pH 7. Paper sheet formation is then carried out with this liquor. The paper so obtained is dyed in a deep yellow shade having good wetfastness properties.

What is claimed is:

1. A mixture of yellow azo- and azoxystilbene dyes having an absorption lambda max in the range 412–425 nm, as is typical of a C.I. Direct Yellow 11 dye, which dye is obtained from the self-condensation of 4,4'-dinitro-2,2'-stilbenedisulfonic acid in the presence of an alkali metal hydroxide and formaldehyde.

2. A process for the preparation of a mixture of yellow azo- and azoxystilbene dyes having an absorption lambda max in the range 412–425 nm, as is typical of a C.I. Direct Yellow 11 dye, which comprises self-condensing 4,4'-dinitro-2,2'-stilbenedisulfonic acid under alkaline conditions with an excess of formaldehyde beyond that needed for the conversion of 4,4'dinitro-2,2'-stilbenedisulfonic acid to Direct Yellow 6 having an absorption lambda max in the range 404–410 nm.

3. A process according to claim 2, which comprises self-condensing 4,4'-dinitro-2,2'-stilbenedisulfonic acid under alkaline conditions with 3.5–4.1 moles of formaldehyde per mole of 4,4'-dinitro-2,2'-stilbene-disulfonic acid.

4. A process according to claim 3, wherein 3.9–4.0 moles of formaldehyde per mole of 4,4'-dinitro-2,2'-stilbene-disulfonic acid is employed.

5. A process according to claim 4, wherein 3.95 moles of formaldehyde per mole of 4,4'-dinitro-2,2'-stilbene-disulfonic acid is employed.

6. A process according to claim 2, wherein formaldehyde is employed in the form of paraformaldehyde or formalin.

7. A process for preparation of a concentrated aqueous solution of a mixture of yellow azo- and azoxystilbene dyes having an absorption lambda max in the range 412–425 nm, as is typical of a C.I. Direct Yellow 11 dye, which comprises:

(a) self-condensing 4,4'-dinitro-2,2'-stilbenedisulfonic acid under alkaline conditions with an excess of formaldehyde beyond that needed for the conversion of 4,4'dinitro-2,2'-stilbenedisulfonic acid to Direct Yellow 6 having an absorption lambda max in the range 404–410 nm;

(b) acidifying the reaction mixture of step (a) after the condensation reaction is substantially complete;

(c) conducting a first cation exchange by adding the acidified mixture of step (b) to a mixture containing a water-insoluble low molecular weight ketone and at least one trialkylamine containing 12 to 40 carbon atoms, the amount of trialkylamine, and the reaction time and temperature being sufficient to convert the azo- or azoxystilbene dye completely into the corresponding ammonium salt;

(d) conducting a second cation exchange by adding to the ketone phase an aqueous solution of a mono-, di- or trialkanolamine containing 2 to 4 carbon atoms in each alkyl moiety, the amount of trialkanolamine and the time and temperature of the reaction being sufficient to induce transfer of substantially all of the dye from the ketone solvent phase to the water phase; and (e) separating the aqueous dye solution from the ketone phase.

8. A process according to claim 7, wherein 3.5–4.1 moles of formaldehyde per mole of 4,4'-dinitro-2,2'-stilbene-disulfonic acid is employed.

9. A process according to claim 8, wherein 3.9–4.0 moles of formaldehyde per mole of 4,4'-dinitro-2,2'-stilbene-disulfonic acid is employed.

10. A process according to claim 7, wherein formaldehyde is employed in the form of paraformaldehyde or formalin.

11. A process according to claim 7, wherein the low molecular weight ketone has a solubility in water of less than about 5 weight % at room temperature and contains five to eight carbon atoms.

12. A process according to claim 11, wherein the low molecular weight ketone is methyl isopropyl ketone, methyl n-propyl ketone, diethyl ketone, methyl n-butyl ketone, methyl isobutyl ketone, methyl n-amyl ketone, cyclohexanone, cyclopentanone, 2-methylcyclopentanone or 2-methylcyclohexanone.

13. A process according to claim 12, wherein the low molecular weight ketone is methyl isobutyl ketone.

14. A process according to claim 7, wherein a trialkylamine containing a total of 12 to 25 carbon atoms is used for the first cation exchange reaction.

15. A process according to claim 14, wherein trilsoocty-lamine or tri-n-octylamine is used for the first cation exchange reaction.

16. A process according to claim 7, wherein the second cation exchange reaction is carried out with a $C_2$–$C_4$dialkanolamine.

17. A process according to claim 7, wherein the second cation exchange reaction is carried out with diethanolamine.

18. A process according to claim 7, whereby the sparingly soluble alkali metal dye salt is converted into a readily water-soluble diethanolammonium salt via a lipophilic tri-isooctylammonium salt.

19. A process according to claim 7, whereby the sparingly soluble alkali metal dye salt is converted into a readily water-soluble diethanolammonium salt via a lipophilic tri-n-octylammonium salt.

20. An aqueous solution of a mixture of yellow azo- and azoxystilbene dyes having an absorption lambda max in the range 412–425 nm, as is typical of a C.I. Direct Yellow 11 dye, which comprises a dye which is obtained from the self-condensation of 4,4'-dinitro-2,2'-stilbenedisulfonic acid in the presence of an alkali metal hydroxide and formaldehyde and which is in the form of a salt of a mono-, di- or trialkanolamine containing 2 to 4 carbon atoms in each alkyl moiety.

* * * * *